Patented Sept. 15, 1931

1,823,499

UNITED STATES PATENT OFFICE

GEORGE LUTZ, OF ROCKY RIVER, OHIO, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS OF MAKING THE PIPERIDINE SALT OF PENTAMETHYLENE-DITHIO-CARBAMIC ACID

No Drawing.    Application filed May 11, 1929.   Serial No. 362,456.

The piperidine salt of pentamethylene-dithio-carbamic acid was amongst the first organic substances used in the acceleration of the vulcanization of caoutchouc substances and due to its most powerful action it is still used today in the production of numerous rubber articles. This accelerator having the following formula:

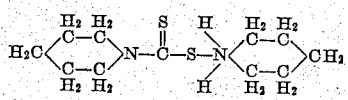

has commonly been produced by the direct action of carbon bisulfide upon pure piperidine and purification of the crude reaction product. It was found, however, that technical or impure piperidines do not give a good yield of the salt and produce compounds containing slight amounts of impurities which in a very unfavorable way affect the stability of the accelerator.

My invention relates to a process of reacting with piperidine upon carbon-bisulfide in the presence of a solvent; it gives practically theoretical yields and produces directly an accelerator which is stable under ordinary conditions of storing, shipping and handling in the mill room of rubber factories.

It comprises the use of solvents in which both raw materials, their impurities and by-products of the reaction are easily soluble, whereas the desired piperidine salt of the pentamethylene-dithio-carbamic acid is exceedingly little soluble therein.

Such solvents are found amongst the aliphatic and alicyclic hydrocarbons which are liquid at ordinary temperatures and boil below about 250° C.

No generic scientific name seems to have been adopted for non-benzenoid cyclic hydrocarbons which are partly unsaturated, such as cyclopentene, cyclohexene, methylcyclopentene and others, and I desire it to be understood that for convenience sake, the term "alicyclic" as used herein is meant to include such partially unsaturated non-benzenoid, cyclic hydrocarbons.

Some of the aliphatic and alicyclic hydrocarbons have in late years become commercially available through various processes including hydrogenation of benzenoid hydrocarbons. The process of my invention does not, however, require the use as solvents of the pure, chemical individuals of this group of hydrocarbons; it is very conveniently performed with mixtures of said various hydrocarbons.

Such mixtures obtained in the petroleum industry are sometimes referred to as paraffin hydrocarbons of petroleum origin and are better known commercially as gasolines.

As is well known, gasolines are today obtained from various sources, such as from casing head gas rectification, from cracking processes, from direct distillation of crude petroleum, etc., and while the various gasolines are of somewhat different compositions, they are all mixtures of aliphatic hydrocarbons containing more or less alicyclic products, and are all available for the performance of my invention.

My novel process comprises essentially dissolving either one of the two raw materials, piperidine and carbon-bisulfide in the desired solvent, and adding the other material; the reaction between the piperidine and the carbon-bisulfide is strongly exothermic, the heat generated is absorbed by the solvent and excessive rise in temperature is prevented, the reaction proceeds gradually and the piperidine salt crystallizes out, usually in the form of beautiful needles. The salt is separated from the supernatant liquor by any well known means, and dried, preferably at low temperature, or under vacuum. The solvent recovered contains the impurities of the piperidine and of the carbon-bisulfide, but it can be used for succeeding batches, with such additions of solvent as required to compensate for mechanical losses, until too much of the impurities have accumulated.

The solvent is then recovered by distillation. This recovery is also conveniently effected by washing the spent solvent with dilute aqueous acids, such as hydrochloric or sulfuric, to remove basic impurities, and then to dry the solvent by passing it over calcium chloride or treating it with concentrated sulfuric acid. When using cheap gasoline, the recovery process might not be economical and the spent solvent can be discarded.

The so obtained piperidine salt of pentamethylene-dithio-carbamic acid is, when ground, a practically colorless powder, which is very stable under ordinary conditions and has the characteristic accelerating properties of the salt prepared in the usual way.

Technical piperidine is available in a quality containing only about 80% actual piperidine, the balance being pyridine and its homologues, piperidine homologues and water. My novel process is particularly adapted to the use of such technical piperidine.

85 parts by weight of technical, 80% piperidine were added to 1600 parts by weight of gasoline. 38 parts by weight of carbon bisulfide were slowly run into this solution. The temperature of the solution rose and the piperidine salt of the pentamethylene-dithio-carbamic acid precipitated in the form of fine, practically colorless needles. After cooling to room temperature, the crystals were filtered off, washed with a little gasoline and dried for about an hour at about 35° C. The resulting salt was after grinding eminently suited as a vulcanization accelerator.

The recovered solvent was made up to 1600 parts, 85 parts technical piperidine dissolved therein, 35 parts carbon-bisulfide added and the same procedure as described above continued. This was repeated four times more before the solvent was discarded. The piperidine salt resulting from such operations was, after grinding, directly usable as a vulcanization accelerator.

My novel process is similarly performed, when using other liquid aliphatic or alicyclic hydrocarbons or mixtures thereof boiling below 250° C. as solvents. Hexahydrobenzene is for instance, well suited for this purpose, but in view of its somewhat high price its recovery would be necessary and it could hardly compete with the cheap and easily available paraffin hydrocarbons of petroleum origin.

I claim:

1. The process of contacting piperidine and carbon-bisulfide in a solvent comprising a hydrocarbon of the group constituted by aliphatic and alicyclic hydrocarbons which are inert with respect to the reactants, liquid at ordinary temperature and boil below about 250° C.

2. The process of contacting piperidine and carbon-bisulfide in a solvent consisting of liquid paraffin hydrocarbons of petroleum origin boiling below about 250° C.

3. The process of making the piperidine salt of pentamethylene-dithio-carbamic acid which comprises adding piperidine and carbon-bisulfide to gasoline and separating the precipitated salt from the solvent.

In testimony whereof, I affix my signature.

GEORGE LUTZ.